United States Patent [19]

Miller

[11] 3,724,619

[45] Apr. 3, 1973

[54] SELF-ADJUSTING ELECTROMAGNETIC CLUTCH-BRAKE

[75] Inventor: Donald L. Miller, Horseheads, N.Y.

[73] Assignee: The Bendix Corporation, Southfield, Mich.

[22] Filed: Mar. 31, 1971

[21] Appl. No.: 129,744

[52] U.S. Cl..................192/18 B, 188/71.8, 192/35, 192/84 A, 192/111 A
[51] Int. Cl.............................................F16d 13/22
[58] Field of Search...192/84 R, 84 A, 111 B, 111 A, 192/54, 18 B, 35; 188/71.8

[56] References Cited

UNITED STATES PATENTS

| | | | |
|---|---|---|---|
| 2,481,028 | 9/1949 | Lear | 192/18 B |
| 2,692,035 | 10/1954 | Rabinow | 192/84 R |
| 2,893,528 | 7/1959 | Ryba | 192/111 A |
| 3,168,175 | 2/1965 | Straub et al. | 192/111 A |

Primary Examiner—Charles J. Myhre
Assistant Examiner—Randall Heald
Attorney—Bruce A. Yungman and Plante, Hartz, Smith & Thompson

[57] ABSTRACT

An electromagnetic clutch with rear compensating means having two sets of coacting friction discs adapted for releasably coupling a driving and driven rotary complement. When the clutch is energized, the armature, which is not in the drive train, contactively engages with the pole faces of the electromagnet causing the freely mounted armature to rotate with the driving member; an adjusting ring which is slidably splined to the driven rotary component and advanceably threaded to the armature for relative rotation therewith, thereby applies the necessary engagement pressure to the friction disc assembly causing torque to be transmitted from the driving to the driven rotary component through the disc assembly. Any lost motion occasioned by wear of the friction disc is automatically compensated by the screw-action of the adjusting ring upon the armature. When the clutch is de-energized, a resiliently biased braking member which is slidably splined to the clutch adjusting ring is caused to bear against a stationary braking body to achieve braking. The brake member is advanceably threaded to a brake adjusting ring to automatically compensate for wear of the braking surfaces.

11 Claims, 1 Drawing Figure

PATENTED APR 3 1973 3,724,619
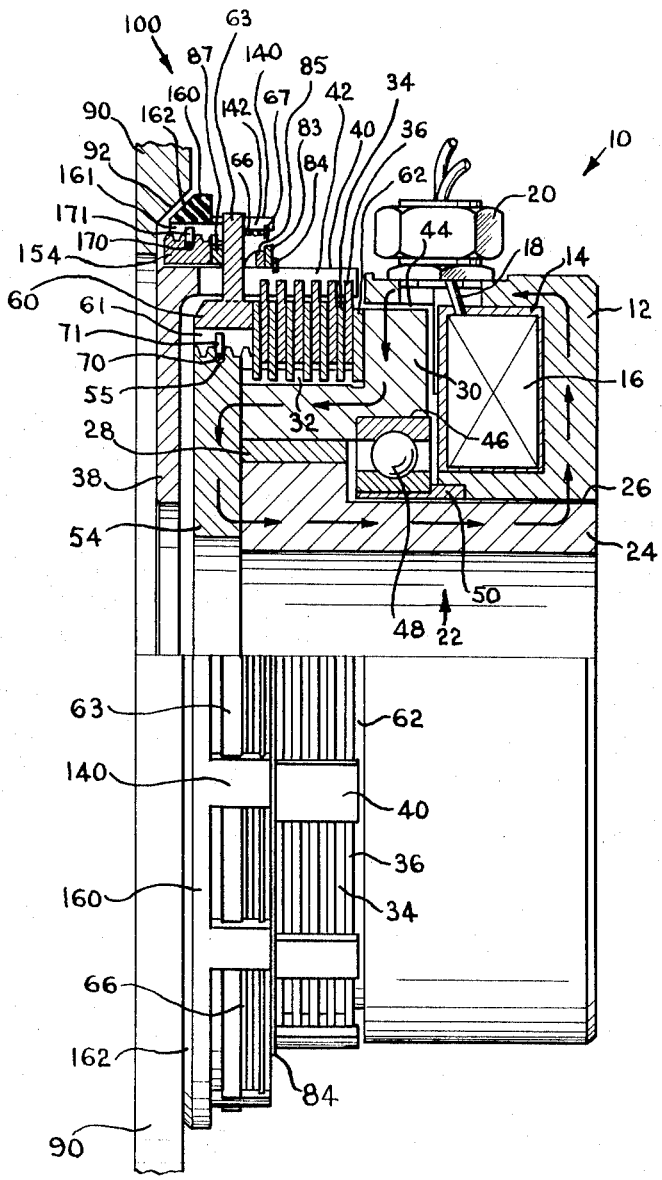
DONALD L. MILLER
INVENTOR.
BY Bruce H. Yungman

SELF-ADJUSTING ELECTROMAGNETIC CLUTCH-BRAKE

BACKGROUND OF THE INVENTION

This invention relates to electrically operated friction devices and controls therefor and more particularly to an electromagnetic self-adjusting disc clutch-brake.

BRIEF DESCRIPTION OF THE PRIOR ART

Clutches and brakes as now constructed must be taken out of operation and serviced when it is necessary to adjust the same to compensate for wear of the friction surfaces or shoes. This is expensive and troublesome. In order to avoid the need for frequent adjustment, the throw or relative movement of main parts of the clutch or brake is sometimes made substantial. This is undesirable for mechanical reasons and slows the operation or response of the clutch or brake. A large throw is particularly undesirable when the clutch is of the magnetic type for a greatly increased magnetic excitation is required when a substantial spacing or throw is provided. In prior magnetic clutches at least two methods have been employed to allow for wear of the clutch facings. One is to use a very large magnetic gap so that wear does not make an appreciable difference in the gap length. The other is to let the magnetic surfaces touch each other and to let the iron wear with the friction surfaces. In the first approach, the reluctance changes with wear, which is highly undesirable since the same excitation results in different amounts of pull (and, therefore, torque). In the second method, relining is difficult, and steel is very poor friction material when used against steel. Further, when the armature is used as a torque transmitting member, the reluctance between the magnetic pole faces and the armature changes as the friction surfaces become porous and worn.

Self-adjusting clutches are well known in the art, however, in most of these devices the adjusting occurs when the operating "throw" exceeds a predetermined value. That is, for the adjustment to take effect, the clutch or brake must be released and re-engaged. Some prior art designs attempted to get around this defect by adjusting the disengaged spacing between the friction surfaces in order to compensate for wear; that is, no adjustment occurred in these devices until the main friction surfaces wore to the extent necessary to actuate the self-adjusting mechanism. Thus, none of the prior art designs maintained a constant pressure on the disc pack since the magnetic engaging force varied over the life of the clutch.

Many new uses are being found for electromagnetic clutches wherein it has been found necessary and/or desirable to rapidly and efficiently brake any accessory which may be connected to the output of the clutch. However, as far as I have been able to determine, no clutch is known in the art that provides a self-adjusting braking mechanism that is operatively coupled to a self-adjusting electromagnetic clutch.

SUMMARY OF THE PRESENT INVENTION

This invention is an electromagnetic clutch apparatus for torque transmission having input means, output means, clutch actuating means including an electromagnetic winding, an armature rotatably connected to the output means and operative to contactively engage with said input means in response to the actuating means, a friction disc assembly which includes two sets of coacting friction discs adapted for releasably coupling the input and output means, a clutch adjusting ring advanceably threaded to the armature and slidably splined to the output means for operative engagement with said friction disc assembly, a resiliently biased braking member slidably splined to the clutch adjusting ring for automatically applying braking action to the output means whenever the clutch is de-energized, and a brake adjusting ring threadably received within the friction braking member and operative to automatically adjust the braking member to compensate for any wear of the braking surface. Detent means are also provided to maintain the relative adjusted positions of the clutch adjusting ring and the friction braking member.

It is, therefore, an object of this invention to provide an improved inexpensive, efficient, self-adjusting electromagnetic friction device. A particular feature of this invention pursuant to this object is the provision of a clutch adjusting ring threadably mounted to an armature which is not in the drive train. Another feature of this invention, pursuant to this object, is the provision of a friction braking member threadably mounted to a brake adjusting ring and operatively coupled to the clutch self-adjusting mechanism.

It is another object of this invention to provide a self-adjusting electromagnetic clutch-brake in which automatic adjustment is made independently of whether the clutch is periodically released and engaged or whether it remains engaged permanently at full torque.

It is still another object of this invention to provide a self-adjusting wear compensating clutch-brake which in the energized mode continuously adjusts for wear in the disc pack, and which in a de-energized mode continually adjusts for wear of the friction braking member. Pursuant to this object, excessive wear in the disc pack is not necessary before the self-adjusting mechanism is activated since the pressure on the friction discs is kept constant throughout the life of the clutch. This same feature is also true of the self-adjusting braking mechanism since the pressure on a stationary braking surface is held constant whenever the clutch is de-energized.

It is still a further object of this invention to provide an electromagnetic clutch which minimizes the reluctance in the flux path linkage by providing an armature which is not the principal torque carrying member and which is not in the drive train. That is, the flat smooth contactive relationship between the armature and the electromagnet's pole face is maintained throughout the life of the clutch. Thus, a strong magnetic engaging force is guaranteed regardless of the wear exhibited by the friction discs.

Another object of this invention is to provide an electromagnetic clutch brake in which the electromagnetic engaging force is unaffected by wearing of the torque carrying members, since the flux does not pass through the torque transmitting surfaces.

Still a further object of this invention is the provision of a unique and simplified wear adjusting means to automatically maintain the clutch armature in close contactive engagement with the electromagnet's pole faces, regardless of the wear experienced by the torque transmitting members.

It is another important object of this invention to provide a multiple disc clutch with automatic wear compensating means in which it is unnecessary to ever adjust the air gap between the armature and the pole face since it is always maintained at or near to zero. By satisfying the requirements dictated by this object, the self-adjusting feature of this invention more than doubles the dynamic and static torque of a clutch of similar design without the self-adjusting wear compensating feature.

It is another object of this invention to provide an improved self-adjusting clutch-brake in which a relatively constant magnetic engaging force is maintained regardless of the wear experienced by the friction discs and/or the friction braking member.

It is still a further object of this invention to provide a self-adjusting electromagnetic clutch which includes a new and novel self-adjusting braking means operatively coupled to the self-adjusting clutch wear compensating feature.

Other objects and advantages of this invention will become apparent from the following detailed description taken in conjunction with the accompanying drawing.

BRIEF SUMMARY OF THE DRAWING

The drawing shows, in a single FIGURE view, partially in section, the presently preferred embodiment of my invention in the engaged position.

DETAILED DESCRIPTION OF THE PREFERRED EMBODIMENT

Referring to the drawing, my electromagnetic clutch is shown generally designated by numeral 10. The clutch includes a fixed or stationary magnet body 12 adapted to be secured to fixed mounting structure (not shown) and fabricated of magnetic flux-conducting material such as iron or steel. Magnet body 12 is formed to provide an annular recess or cavity 14 within which is mounted an electromagnetic coil 16 which may be secured in the cavity by resin or other conventional means. Coil 16 has leads 18 extending radially upwardly as viewed in the drawing where they may be connected to a controlled power source or control circuit (not shown) through the connector 20.

The clutch of the present invention is reversible with respect to input and output sides and thus, clutch structure which in one installation would be an input member, in another installation would be an output member. Accordingly, rotating input and output members referred to in the following description as driving and driven means respectively, could also have been referred to generically as first and second torque transmitting members. However, for reasons of clarity in description, the generic terminology was avoided.

My clutch further includes a rotary driving member 22 which consists of three integral subparts. First, a generally-cylindrical member 24 defines the radially-inner confine of the clutch and which extends axially so that one end is concentric with the magnet body 12, but having a small but definite radial air gap 26 therebetween. Cylindrical member 24 is fabricated of magnetic fluxconducting material. An annular ring 28 of nonconducting magnetic flux material such as brass or the like forms a second subpart of the driving means 22 and is integrally secured to cylindrical member 24. A third and radially outermost annular member 30 is comprised of magnetic flux-conducting material and is integrally secured to the ring 28 so that the driving member is a laminated member having radially inner and outer magnetic flux conducting portions and an intermediate nonflux conducting section. It will be apparent that magnetic flux is inhibited from travelling radially through the driving member 22, but may travel in a general axial direction to both the inner cylindrical member 24 and the outer annular member 30.

The driving or input member 22 has axially-extending splines 32 formed along one portion of its outer surface on which are slidably mounted a first plurality of annular friction discs 34. It will be readily understood that the spline connection fixes the first plurality of discs to the driving member rotationally while permitting relative axial movement. A second plurality of friction discs are alternately disposed between the adjacent discs 34 to comprise a friction clutch disc pack. Discs 36 are connected to the output or driven member 38 (also referred to herein as the driven means) which has an axially-extending portion 40 having slots 42 providing an axially-slidable but relatively-rotationally fixed connection with the discs 36.

The annular member 30 extends axially to the right as viewed in the drawing of the friction disc pack, forming a reaction plate on one side of the disc pack and providing a second radial air gap 44 with the magnet body 12. The inner radial edge of annular ring 30 has a groove 46 forming a seat for the outer race of bearing 48 which, in turn, is supported at its inner race by sleeve 50 which is brazed or otherwise secured to magnet body 12.

The three laminated sections of the driving member 22 may be integrally secured in various conventional ways, such as, for example, drilling and tapping an oversize screw hole that overlaps all three sections and then inserting a screw (not shown). While a screw, if steel, sould permit a small flux leakage from radially inner to radially outer segments, a certain limited amount of flux leakage can be tolerated, depending on coil and current strength and the flux gap spacing. Moreover, the nonconducting ring need not necessarily be annularly continuous, but may be comprised of a series of annularly-arranged segments interspersed with thin ribs interconnecting the radially inner and outer members just so long as adequate and operative flux strength is maintained in an axial direction.

An annular armature plate 54 is fabricated from magnetic flux-conducting material and is arranged a small spaced distance from one side face of the driving member 22 (in the disengaged mode), and extends radially to overlap all three laminated segments. The radially outer surface of armature 54 is threaded entirely therealong and has a groove 55 formed therein.

At the radial outermost edge of armature plate 54, there is threadably mounted an annular clutch adjusting ring 60. The helical thread or spline which mates clutch adjusting ring 60 to armature 54 is such that armature 54 may rotate relative to clutch adjusting ring 60 (whenever the armature is engaged) thereby imparting a vector component which tends to force ring 60 axially to the right as viewed in the drawing. Clutch adjusting ring 60 extends axially to the right (in the drawing) of armature 54 forming a pressure plate for bearing against the disc pack. Clutch adjusting ring 60 has a plurality of radially extending tanges 63 which are received in slots 42 provided in the radially extending section 40 of output member 38; this connection permits ring 60 to slide axially along member 38 and simultaneously secures ring 60 to output member 38 for rotation therewith.

The clutch adjusting ring 60 has an axially extending slot 61 for engaging an upwardly extending tange 71 of a drag ring 70. Drag ring 70 forms one discontinuous loop or turn and is sprung into groove 55 of armature 54. Drag ring 70, which may be referred to as detent means 70, is so arranged that when armature 54 is rotating more rapidly than the adjusting ring 60, ring 70 will loosely slide in its groove 55. When, on the other hand, armature 54 tends to rotate at a slower speed than adjusting ring 60, ring 70 grips armature 54 by closing upon it more tightly because of the cooperation between tange 71 and the adjusting ring slot 61. [A description and illustration of a retarding ring similar to drag ring 70 can be found in commonly assigned U.S. Pat. No. 3,300,006.] Thus, the detent means 70 prevents the armature from reversing its direction of rotation relative to the adjusting ring when the armature is disengaged, while simultaneously it allows the adjusting ring to rotatably advance on the armature in the same direction of rotation as the driving means when the armature is engaged in order to compensate for any wear that may occur in the disc pack. The "adjusted" position of the armature 54 relative to to the clutch adjusting ring 60 is therefore always maintained.

The adjusting ring 60 and annular spacer or pressure plate 62 at the opposed side of the disc pack are preferably fabricated of nonmagnetic material in installations where the discs 34 and 36 are flux-conducting metal elements to block flux leakage through the disc pack.

The tanges 63 of the clutch adjusting ring 60 extend radially beyond the axial portion 40 of output member 38, thus providing structure to which is mounted the braking means denoted generally by 100. An annular friction braking member 160 is rotatably mounted to the clutch adjusting ring 60 in a manner similar to the connection between output member 38 and clutch adjusting ring 60. That is, braking member 160 has an axially extending portion 140 and a plurality of slots 142 which receive the upwardly extending tanges 63; this connection permits braking member 160 to slide axially along the tanges 63 and simultaneously secures braking member 160 to the clutch adjusting ring 60 for rotation and axial movement therewith. The radially inner surface of braking member 160 is helically splined for receiving mating helical splines of a brake adjusting ring 154. Brake adjusting ring 154 is radially spaced from output member 38 and has a groove therein for receiving an annular drag ring 170. Drag ring 170 has an upwardly extending portion 171 for cooperation with a slot 161 of friction braking member 160. Brake adjusting ring 154 is held in an axially fixed position relative to upwardly extending tanges 63 by an annular spacer or low friction bushing 87. The braking assembly 100 is biased into intimate contact with upwardly extending tanges 63 by a coil spring 66 disposed between the tanges 63 and a lock ring 67 which is secured in a groove in the radially inner surface of axially extending portion 140 of the braking member 160. A wavy spring 85 disposed within coil spring 66 and between the clutch adjusting ring tanges 63 and a washer 83 biases the clutch adjusting ring to the left as viewed in the drawing and serves as the braking spring. Wavy spring 85 and the washer 83 are held from moving axially to the right as viewed in the drawing by means of a lock ring 84 which is fixedly secured in a groove in the radially outer surface of output member 38. Friction braking member 160 is preferably fabricated from an organic friction material and has a frustro-conical surface 162 formed on its radially outer diameter which is adapted to contactively engage with frustro-conical surface 92 of a stationary frame member 90. Stationary frame member 90 is axially spaced from the clutch adjusting ring 60 on the side thereof in opposition to the disc pack.

Braking member 160 is preferably fabricated from an organic friction material in order to meet optimum braking and noise requirements. In addition, the use of a conically shaped braking member results in several favorable design advantages. First, the highly efficient conical braking surfaces do not require as strong a braking force as would normally be required; thus, the resilient braking force required of wavy spring 85 is greatly reduced. Secondly, since the braking force required by wavy spring 85 is reduced, a lighter, more economical spring material may be used. Thirdly, since the braking force exerted by member 85 is less, the required magnetic engaging force necessary to overcome the braking force (when the clutch is energized) is also substantially reduced.

Those skilled in the art will appreciate the structural and operational similarity between analogous self-adjusting clutch and self-adjusting brake mechanisms wherein analogous parts in the braking mechanism are preceded by the numeral 1. However, although the self-adjusting mechanism operate in basically the same way, the relative rotational directions and speeds, and the angle of the helical threads are reversed for the self-adjusting brake mechanism 100. That is, the helical spline which mates braking member 160 to the brake adjusting ring 154 is such that brake adjusting ring 154 may rotate relative to braking member 160 (whenever the clutch is disengaged) thereby imparting a vector component which tends to force braking member 160 axially to the left as viewed in the drawing. Brake adjusting ring 154 extends axially to the left (in the drawing) of braking member 160, forming a reaction plate for bearing against an axially perpendicular portion of stationary member 90. Drag ring 170 which is identical in design to drag ring 70, although a greater diameter, is so arranged that when brake adjusting ring 154 is rotating at a slower speed than the braking member 160, ring 170 will loosely slide in its groove provided in the radially outer surface of brake adjusting ring 154. When, on the other hand, brake adjusting ring 154 tends to rotate more rapidly than braking member 160, ring 170 grips brake adjusting ring 154 by closing upon it more tightly because of the cooperation between tange 171 and the braking member slot 161. Thus, the drag ring 170 prevents the brake adjusting ring 154 from reversing its direction of rotation relative to the braking member 160 when the clutch is engaged, while simultaneously it allows braking member 160 to rotatably advance on the brake adjusting ring 154 (in the opposite direction of rotation as the driving means 22) in order to compensate for any wear that may occur on the braking surface when the clutch is disengaged. The "adjusted" position of the brake adjusting ring 154 relative to braking member 160 is, therefore, always maintained. The zero air gap condition that exists between armature 54 and the pole faces of the driving means 22 when the clutch is engaged also exists between the brake adjusting ring 154 and the axially perpendicular portion of stationary housing member 90 in the disengaged position.

OPERATION OF THE PREFERRED EMBODIMENT

The clutch, as illustrated in the drawing, is shown in the engaged position whereby the driving and driven rotary members 22 and 38, respectively, are frictionally coupled. In this condition, electrical power is supplied through leads 18 to coil 16 which generates an electromagnetic field following the path illustrated by arrows in the drawing. This flux travels in a loop through the magnet body 12, jumping the radial air gap 44, axially through the outer annular member 30 (thus reaching past the disc pack), jumping the axial air gap between armature 54 and driving means 22 to armature plate 54. From thence, the flux travels radially inwardly of the armature plate where it again jumps the air gap between the armature and the driving means passing through cylindrical member 24, the radial air gap 26, back to the magnet body 12.

The magnetic flux pulls the armature plate 54 into contactive engagement with the driving means 22 (which is assumed to be rotating) causing the armature-adjusting ring assembly and the braking assembly 100 to rotate with the driving means 22. However, since the output member 38 and the braking assembly 100 exert a relatively substantial rotational load on clutch adjusting ring 60 through the tanges 63, clutch adjusting ring 60 is caused to coact with the relatively slower rotating output member 38 and the mating helical threads of the relatively rapidly rotating armature 54; this in turn causes ring 60 to be driven to the right as viewed in the drawings, thereby compressing the disc pack for clutch engagement.

When the circuit to coil 16 is interrupted, the flux decays, permitting braking spring 85 to push the clutch adjusting ring 60 and, therefore, the braking member 160 into contactive engagement with the stationary member 90. The frustro-conical braking surface 162 reacts against the frustro-conical braking surface 92 thus bringing the output member 38 to a state of rest. The "adjusted" position of armature 54 relative to the clutch adjusting ring 60 is held by the detent means 70. When the electromagnet is again energized, its action upon armature 54 will instantly draw the clutch adjusting ring 60 into operative position against the disc pack. No further relative movement by clutch adjusted ring 60 upon the screw threaded surface of armature 54 will take place until the frictional surfaces of the friction discs become worn. Any lost motion occasioned by the wearing away of the frictional surfaces of the friction discs will be at once taken up by the coaction of clutch adjusting ring 60 with the output member 38 and the screw threaded outer surface of armature 54 as was described above. Similarly, whenever the brake adjusting ring 154 which is in light contact with stationary braking member 90 is caused to rotate slower than the friction braking member 160, it will cause braking member 160 to be driven to the left as viewed in the drawing into closer contact with the frustro-conical surface 92 of the stationary braking member 90. That is, any lost motion occasioned by the wearing away of the braking surface 162 of the braking member 160 will be at once taken up by the coaction of braking member 160 with the output member 38 and the screw threaded outer surface of brake adjusting ring 154 as was described above. The "adjusted" position of the brake adjusting ring 154 relative to the braking member 160 is held by the drag ring 170.

In the engaged position, armature 54 remains in close contactive engagement with the driving means 22 and little or no air gap between these members is allowed to develop. Simultaneously, almost all torque transferred between the driving means and the driven means is carried by the disc pack. Similarly, when the clutch is disengaged, the brake adjusting ring 154 remains in close contactive engagement with the axially perpendicular portion of stationary member 90 in order to provide instant brake wear adjustment while simultaneously almost all braking torque between the braking means 100 and the stationary member 90 is carried by the frustro-conical surface 162 of the braking member 160.

While only the preferred embodiment of the invention has been disclosed, it will be apparent to those skilled in the art that changes may be made to the invention as set forth in the appended claims, and, in some cases, certain features of the invention may be used to advantage without corresponding use of other features. Accordingly, it is intended that the illustrative and descriptive materials herein be used to illustrate the principles of the invention and not to limit the scope thereof.

I claim:

1. In combination with an electromagnetic clutch-brake of the type having a friction disc assembly, which assembly includes two sets of coacting friction discs adapted for releasably coupling a driving and a driven rotary component, and wherein pressure is exerted on said disc assembly by an armature's response to a magnetic force created by electromagnetic actuating means, the improvement comprising:

self-adjusting wear compensating clutch means, said compensating means including a clutch adjusting ring advanceably and concentrically threaded to said armature for relative rotation therewith, said ring being slidably adapted for axial movement along said driven rotary component for contactive engagement with said friction disc assembly, and said ring being secured to said driven rotary component for rotation therewith so that upon energization of said actuating means, said armature is drawn into contactive engagement with said driving rotary component which in turn causes said clutch adjusting ring to coact with said driven rotary component and its threaded connection with said armature, thereby axially advancing said adjusting ring into contactive engagement with said friction disc assembly; and self-adjusting wear compensating brake means for braking said driven rotary means when said electromagnetic actuating means is de-energized, said brake means including a brake member secured to said self-adjusting clutch means for rotation therewith and a brake adjusting ring operatively coupled to said brake member so that when said electromagnetic actuating means is de-energized said brake member and said brake adjusting ring co-act to compensate for wear of the brake member.

2. The combination as claimed in claim 1 including further first detent means for continuously retarding said armature from rotatably reversing its direction of rotation relative to said clutch adjusting ring.

3. The combination as claimed in claim 1 wherein the electromagnetic actuating means comprises a magnetic body disposed about said driving means and an electromagnetic winding disposed within said magnet body.

4. The combination as claimed in claim 1 wherein the self-adjusting brake means includes clutch disengagement means adapted to exert an axial load on said clutch adjusting ring opposite in direction to the electromagnetic engaging force.

5. The combination as claimed in claim 4 wherein said self-adjusting brake means is operative to apply a braking action to said driven rotary component under the influence of said clutch disengagement means; and a rotatively fixed frame member for reacting against said brake member when said brake member is biased into contact with said frame member upon de-energization of said clutch actuating means.

6. In combination with an electromagnetic clutch-brake of the type having a friction disc assembly, which assembly includes two sets of coacting friction discs adapted for releasably coupling a driving and a driven rotary component, and wherein pressure is exerted on said disc assembly by an armature's response to a magnetic force created by electromagnetic actuating means, the improvement comprising:

self-adjusting wear compensating clutch means, said compensating means including a clutch adjusting ring advanceably and concentrically threaded to said armature for relative rotation therewith, said ring being slidably adapted for axial movement along said driven rotary component for contactive engagement with said friction disc assembly, and said ring being secured to said driven rotary component for rotation therewith so that upon energization of said actuating means, said armature is drawn into contactive engagement with said driving rotary component which in turn causes said clutch adjusting ring to coact with said driven rotary component and its threaded connection with said armature, thereby axially advancing said adjusting ring into contactive engagement with said friction disc assembly;

self-adjusting wear compensating brake means for braking said driven rotary means when said electromagnetic actuating means is de-energized, said self-adjusting brake means being operatively coupled to said self-adjusting clutch means;

said self-adjusting brake means including clutch disengagement means adapted to exert an axial load on said clutch adjusting ring opposite in direction to the electromagnetic engaging force;

said self-adjusting brake means including an annular friction brake member rotatably mounted to said clutch adjusting ring and operative to apply a braking action to said driven rotary component under the influence of said resilient disengagement means, said annular friction brake member being fabricated from an organic friction material; and a rotatably fixed frame member for reacting against said brake member when said brake member is biased into contact with said frame member upon de-energization of said clutch actuating means.

7. The combination as claimed in claim 6 wherein said annular friction brake member has a frusto-conical braking surface for reacting against a mating frusto-conical surface of said fixed frame member.

8. In combination with an electromagnetic clutch-brake of the type having a friction disc assembly, which assembly includes two sets of coacting friction discs adapted for releasably coupling a driving and a driven rotary component, and wherein pressure is exerted on said disc assembly by an armature's response to a magnetic force created by electromagnetic actuating means, the improvement comprising:

self-adjusting wear compensating clutch means, said compensating means including a clutch adjusting ring advanceably and concentrically threaded to said armature for relative rotation therewith, said ring being slidably adapted for axial movement along said driven rotary component for contactive engagement with said friction disc assembly, and said ring being secured to said driven rotary component for rotation therewith so that upon energication of said actuating means, said armature is drawn into contactive engagement with said driving rotary component which in turn causes said clutch adjusting ring to coact with said driven rotary component and its threaded connection with said armature, thereby axially advancing said adjusting ring into contactive engagement with said friction disc assembly; and self-adjusting wear compensating brake means including an annular friction braking member rotatably mounted to said clutch adjusting ring and adapted to slide axially there along, said braking member having helical threads in one of its radial surfaces, a brake adjusting ring concentrically and threadably received within said mating helical threads of said annular braking member, a resilient braking member operative to exert a braking force on said clutch adjusting ring, and a rotatably fixed frame member for reacting against said brake member when said brake member is biased into contact with said frame member by said resilient brake means when said actuating means is de-energized.

9. The combination as claimed in claim 8 including further detent means for retarding said brake adjusting ring from rotatably reversing its direction of rotation relative to said friction braking member.

10. The combination as claimed in claim 8 wherein said annular friction braking member is fabricated from an organic friction material.

11. The combination as claimed in claim 1 including second detent means for continuously retarding said brake adjusting ring from rotatably reversing its direction of rotation relative to said braking member.

* * * * *